(12) United States Patent
Agata

(10) Patent No.: US 6,469,839 B2
(45) Date of Patent: Oct. 22, 2002

(54) PROJECTOR APPARATUS

(75) Inventor: Kazuhiro Agata, Tokyo (JP)

(73) Assignee: NEC ViewTechnology Ltd., Tokyo (JP)

( * ) Notice: Subject to any disclaimer, the term of this patent is extended or adjusted under 35 U.S.C. 154(b) by 37 days.

(21) Appl. No.: 09/794,917

(22) Filed: Feb. 28, 2001

(65) Prior Publication Data

US 2001/0019398 A1 Sep. 6, 2001

(30) Foreign Application Priority Data

Mar. 1, 2000 (JP) ........................................ 2000-055210
Mar. 29, 2000 (JP) ........................................ 2000-090449

(51) Int. Cl.[7] .............................. G02B 15/14; G02B 7/02
(52) U.S. Cl. ........................ 359/694; 359/811; 359/813; 359/819; 359/823
(58) Field of Search ................................ 359/811, 813, 359/818, 819, 820, 823, 694, 699, 700, 554; 396/85, 87

(56) References Cited

U.S. PATENT DOCUMENTS 5,684,644 A * 11/1997 Spears et al. ................ 359/823
6,201,650 B1 * 3/2001 Jonas et al. .................. 359/819

FOREIGN PATENT DOCUMENTS

| JP | 05249409 A | 9/1993 |
| JP | 09138377 A | 5/1997 |
| JP | 10319499 A | 12/1998 |
| JP | 11258565 A | 9/1999 |

* cited by examiner

Primary Examiner—Loha Ben
(74) Attorney, Agent, or Firm—Young & Thompson

(57) ABSTRACT

To provide a highly-precise mechanism in a simple structure as a positional adjusting mechanism of a projector lens on a display device surface, and to provide a projector apparatus capable of manually moving the projector lens by means of an user interface unified into the focus and zoom adjusting mechanism, an outer surface of a lens guide portion is a surface of uneven shapes in which a plurality of protruded portions, each of whose vertical sections has an angle of inclination of 45° and an angle of apex of 90° with respect to a surface of a liquid crystal panel, and a plurality of recesses, each opposing thereto, are arranged at a constant pitch in a vertical direction. An inner surface of the lens guide portion has such a shape as to constitute a part of a cylinder of a tapered configuration such that an inner diameter becomes larger from an incident light side toward an outgoing light side. A lens holding portion is fixed to a projector body, and has a surface having plural uneven shapes, which are brought into tight contact with the the surface having plural uneven shapes of the lens guide portion. An outer periphery of a lens fixing portion is formed in a tapered configuration such that an outer diameter becomes larger from the incident light side toward the outgoing light side.

16 Claims, 10 Drawing Sheets

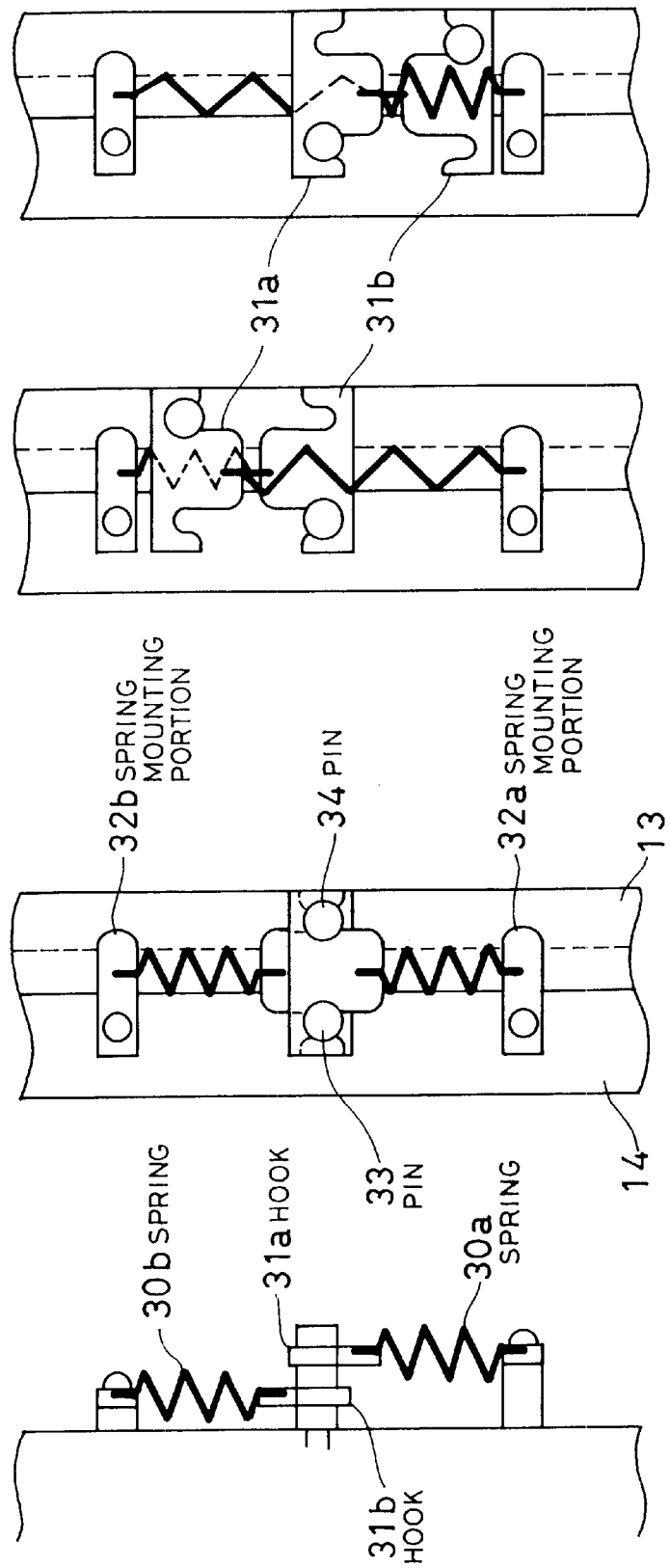

PROJECTOR APPARATUS

BACKGROUND OF THE INVENTION

1. Field of the Invention

The present invention relates to a projector apparatus, and more particularly to a projector apparatus for enlarging and projecting an image on a display device such as a liquid crystal panel on a screen through a projector lens by means of light to be projected from a light source such as a lamp.

2. Description of the Prior Art

Conventionally, as a projector apparatus for enlarging and projecting an image on a personal computer screen or a video apparatus, there is a liquid crystal projector apparatus using a liquid crystal panel for the display device. The liquid crystal projector apparatus forms an image by transmitting and shielding light to be projected from a lamp light source by means of liquid crystal devices disposed in a two-dimensional plane shape on the liquid crystal panel, enlarges and projects the light passed through the liquid crystal panel on the screen by means of the projector lens, and the image is formed on the screen thereby.

The liquid crystal projector apparatus has a mechanism for performing focus and zoom adjustment by rotating a lens-barrel portion, namely, by moving entirely or partially a lens group consisting of lenses in a lens axial direction through the use of a cam and screw mechanism or the like.

As the above-described projector apparatus, there are apparatuses disclosed in Japanese Patent Laid-Open Nos. 11-258565, 10-319499, 09-138377, and 05-249409, and Japanese Utility Model Laid-Open No. 05-021246, or the like.

Since a position of the projector lens is generally fixed to the liquid crystal panel, the liquid crystal projector apparatus can only project the image for a fixed screen position depending upon a position to install the projector apparatus. For this reason, it is necessary to adjust the projector apparatus or the screen to an adequate position, and it takes a lot of time and labor for adjustment.

In most of liquid crystal projectors, the projector lens is fixed to the liquid crystal panel in deviated relationship above by a fixed amount in advance, and the image is projected obliquely above, whereby even in the case where the projector apparatus is set up on top of a stand or the like, it is possible to project the image on a screen at an elevated position, and the projected image is made easy to see.

In the case where the position of the image on the screen should be further deviated upward, however, it is necessary to deviate a direction of projection upward through the use of a height adjusting mechanism mounted onto the front-side leg portion of the projector apparatus. Also, in this case, since the liquid crystal panel surface and the screen surface have different angles, there is a problem that the projected image is warped into a trapezoid shape.

In order to prevent the projected image from being warped into a trapezoid shape, it is necessary to separately prepare for a screen having an inclination mechanism for causing the screen angle to coincide with the liquid crystal panel angle. For this reason, some high-performance projector apparatuses are mounted with a mechanism for adjusting the center position of the projector lens to that of the display device by using a projector lens having a large diameter for a size of the display device and moving the projector lens in parallel with the display device surface by electrically-powered driving such as a motor. These necessitate a complicated mechanism for moving up and down, and right and left while accurately holding a heavy projector lens, leading to an increase in cost.

BRIEF SUMMARY OF THE INVENTION

Thus, it is an object of the present invention to solve the above described problems, to provide a high-precision mechanism in a simple structure as a positional adjusting mechanism for the projector lens to the display device surface, and to provide a projector apparatus capable of manually moving the projector lens by means of a user interface unified into the focus and zoom adjusting mechanism.

Also, it is another object of the present invention to provide the projector apparatus capable of performing a high-precision movement of the projector lens on a two-dimensional plane in a simple structure, and manually moving the projector lens by means of a user interface unified into the focus and zoom adjusting mechanism of the projector lens.

According to the present invention, there is provided a projector apparatus for enlarging and projecting an image on a display device on a screen through a projector lens by means of light to be projected from a light source, comprising:

a lens guide member fixed to the projector lens, whose sectional shape is plural uneven shapes stretched in one axis; a lens holding member holding the projector lens and having a section of plural uneven shapes, which are brought into tight contact with the surface having plural uneven shapes of the lens guide member; and a pressure adjusting mechanism for adjusting pressure to be applied to the surface having plural uneven shapes of the lens guide member and the surface having plural uneven shapes of the lens holding member in a direction of the normal thereto.

According to the present invention, there is provided another projector apparatus for enlarging and projecting an image on a display device on a screen through a projector lens by means of light to be projected from a light source, comprising:

a lens guide member fixed to the projector lens, having a surface of plural uneven shapes stretched in one axial direction; an X guide member having a surface, which are brought into tight contact with the surface having plural uneven shapes of the lens guide member; a Y guide member having a surface of plural uneven shapes stretched in an axial direction intersecting at right angles the X guide member; and a base guide member having a surface, which are brought into tight contact with the surface having uneven shapes of the Y guide member, and being fixed to its own apparatus.

More specifically, in order to achieve the above described object, the projector apparatus according to the present invention is configured by: a lens guide portion fixed to the projector lens, whose section is configured by plural uneven shapes so as to enable the projector lens to move in parallel to the surface of the liquid crystal panel, having the surface configured such that uneven shapes stretch in one axis; a lens holding member, in which section, which are brought into tight contact with the surface having plural uneven shapes of the lens guide portion, has a surface of plural uneven shapes; and a lens fixing portion having a pressure adjusting mechanism for adjusting pressure to be applied to the surfaces having plural uneven shapes which have been formed on the lens guide portion and the lens holding portion in a direction of the normal thereto.

As compared with a case where a guide shaft or the like is used, a contact area between the lens guide portion and the lens holding portion is increased by the surfaces of plural uneven shapes of the lens guide portion and the lens holding portion, and it becomes possible to accurately move the projector lens in parallel with a planar direction of the liquid crystal panel. Also, as compared with a case where the surfaces are planar shapes, the contact area is increased by applying pressure to the surfaces of uneven shapes in the direction of the normal thereto. For this reason, it becomes possible to generate a significant static frictional force for fixing the projector lens portion. Thereby, it becomes possible to arrange the structure so as to adjust and fix the projector lens position with a low parts count.

An operating unit of the lens fixing portion mounted to the outer periphery of the projector lens is rotated around the central axis of the projector lens, whereby pressure in the direction of the normal to the surface of an uneven structure formed in the lens guide portion and the lens holding portion is adjusted to thereby adjust the static frictional force, and it becomes possible to adjust and fix the projector lens position. This makes it possible to adjust the position of the projector lens to the liquid crystal panel by means of the user interface unified into the focus and zoom adjusting mechanism of the projector lens.

On the other hand, in order to achieve the above described object, another projector apparatus according to the present invention is configured by: a lens guide member fixed to the projector lens, having the surface of plural uneven shapes stretched in one axial direction; an X guide member having the surface, which are brought into tight contact with the surface having plural uneven shapes of the lens guide member; a Y guide member having the surface of plural uneven shapes stretched in an axial direction intersecting at right angles the X guide member; and a base guide member having the surface, which are brought into tight contact with the surface having uneven shapes of the Y guide member, and being fixed to the projector apparatus.

Through the use of the surfaces of uneven shapes of each member, it becomes possible to increase the contact area as compared with the plane surfaces and to accurately move the projector lens in parallel with planar direction of the liquid crystal panel, and by applying less pressure perpendicularly to the surfaces of the uneven structure, it becomes possible to generate a significant static frictional force for fixing the projector lens portion. This enables the projector lens to be released and fixed with a low parts count.

A pressure adjusting mechanism operating unit mounted to the outer periphery of the projector lens is rotated around the central axis of the projector lens, whereby pressure in the direction of the normal to the surfaces of an uneven structure formed on the lens guide portion, the X guide member, the Y guide member, and the base guide member respectively is increased and decreased. Thus, the static frictional force is increased and decreased to enable the projector lens position to be fixed and released.

This makes it possible to adjust the position of the projector lens to the liquid crystal panel by means of the user interface unified into the focus and zoom adjusting mechanism of the projector lens. The pressure adjusting mechanism operating unit is mounted in such a structure as to be movable in the direction of projection of the projector lens, whereby it can be housed when no pressure adjustment is performed.

In the lens guide member, the X guide member, the Y guide member, and the base guide member, recesses and protruded portions, which are a part of the surface of plural uneven shapes respectively, are eliminated, whereby it becomes possible to easily assemble by aligning with the center position of the projector lens.

At the center positions on axes, on which the lens guide member and the X guide member, or the Y guide member and the base guide member are movable, there are provided an X center stopper mechanism and a Y center stopper mechanism which give a feeling of click, whereby it becomes possible for the user to confirm the position of the projector lens.

Further, when the pressure of the pressure adjusting mechanism is adjusted to make the projector lens movable, there is mounted a returning mechanism for always returning the projector lens to a certain point, whereby it becomes possible to always return the projector lens to a fixed position, for example, the center position.

BRIEF DESCRIPTION OF THE DRAWINGS

FIG. 8A is a side view showing a positional returning mechanism, which is a part of the projector lens mounting portion of the projector apparatus according to the second embodiment of the present invention; FIG. 8B is a front view showing the positional returning mechanism, which is a part of the projector lens mounting portion of the projector apparatus according to the second embodiment of the present invention; and FIGS. 8C and 8D are front views showing a projector lens adjusting state of the positional returning mechanism, which is a part of the projector lens mounting portion of the projector apparatus according to the second embodiment of the present invention;

DETAILED DESCRIPTION OF THE PREFERRED EMBODIMENTS

Figure 1A:
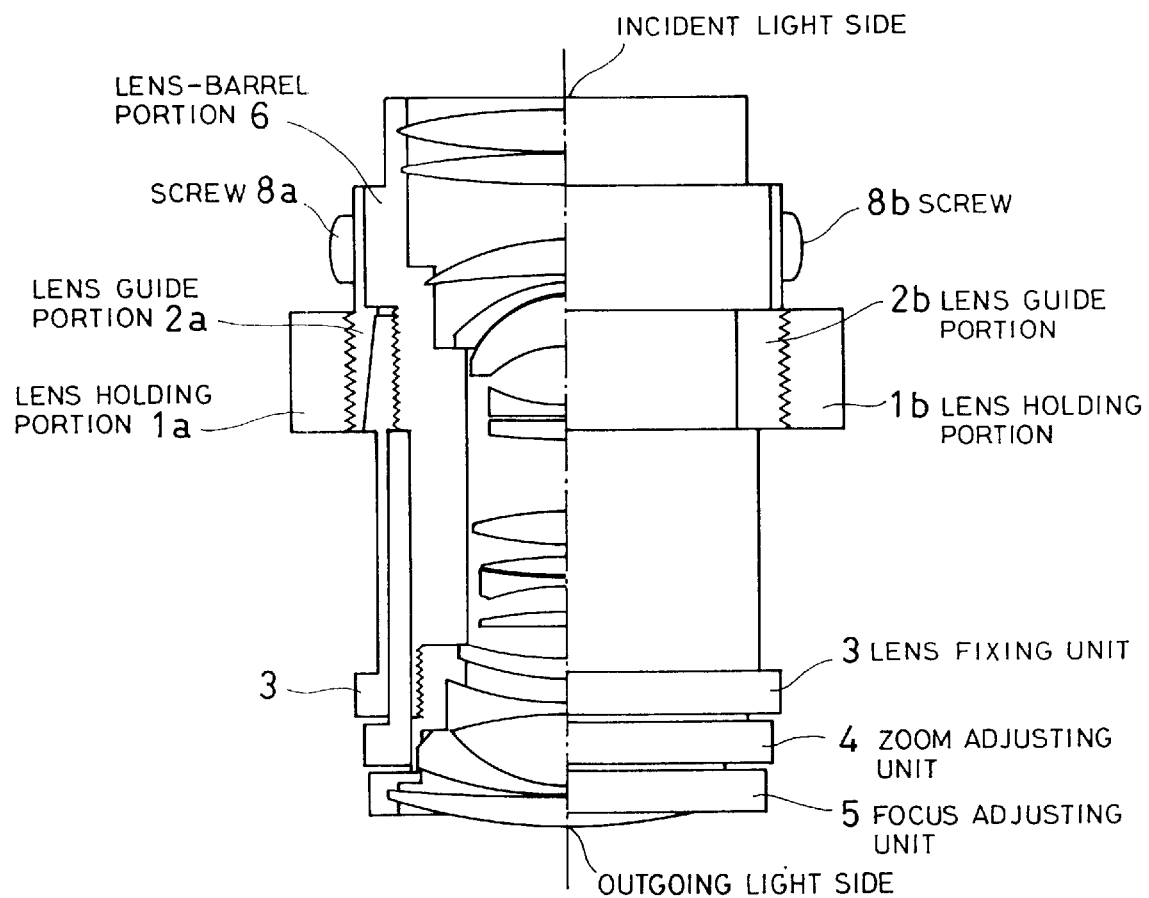
FIG. 1A is a plan view including a partial cross section showing a projector lens mounting portion of a projector apparatus according to a first embodiment of the present invention.

The present invention will be discussed hereinafter in detail in terms of the preferred embodiments of the present invention with reference to the accompanying drawings. FIG. 1A is a plan view including a partial cross section showing the projector lens mounting portion of the projector apparatus according to the first embodiment of the present invention, and FIG. 1B is a front view showing the projector lens mounting portion of the projector apparatus according to the first embodiment of the present invention.

Figure 1B:
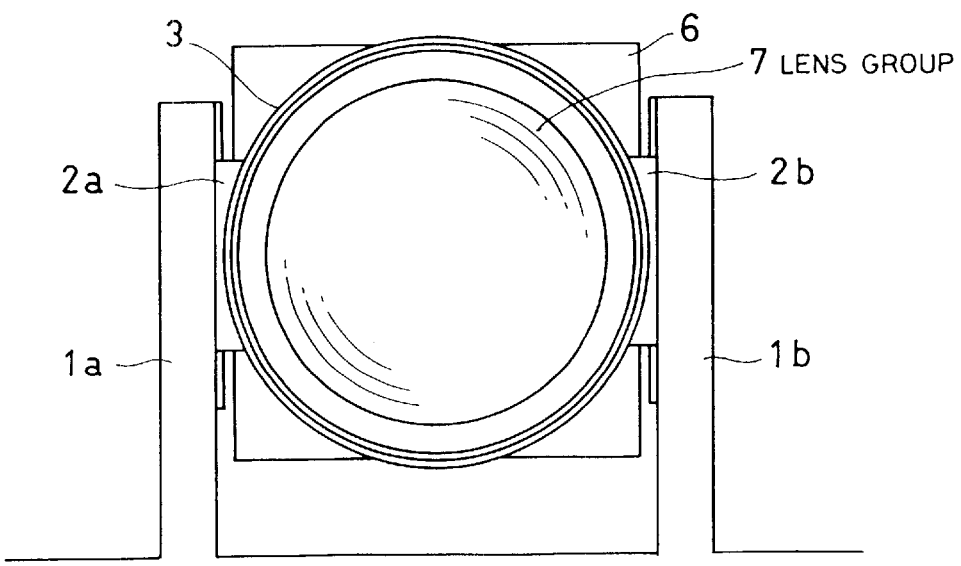
FIG. 1B is a front view showing a projector lens mounting portion of the projector apparatus according to the first embodiment of the present invention.

In these FIGS. 1A and 1B, a projector lens according to the first embodiment of the present invention is configured by a lens group 7 consisting of a plurality of lenses. Parts of the lens group 7 are mounted to a lens-barrel portion 6, a focus adjusting unit 5 and a zoom adjusting unit 4.

The focus adjusting unit 5 and the zoom adjusting unit 4 are mounted to the lens-barrel portion 6 so as to be able to rotate around the lens central shaft. A lens fixing unit 3 is mounted to the lens-barrel portion 6 by means of a screw cut on the inner periphery of the lens fixing unit 3. The outer periphery of the lens fixing unit 3 is formed in a tapered configuration such that the outer diameter becomes larger from the incident light side toward the outgoing light side.

Lens guide portions 2a, 2b are fixed to the plane portion of the lens-barrel portion 6 by means of screws 8a, 8b. The inner surface of the lens guide portions 2a, 2b have such a shape as to constitute a part of a cylinder of a tapered configuration such that the inner diameter becomes larger from the incident light side toward the outgoing light side.

Figure 2:
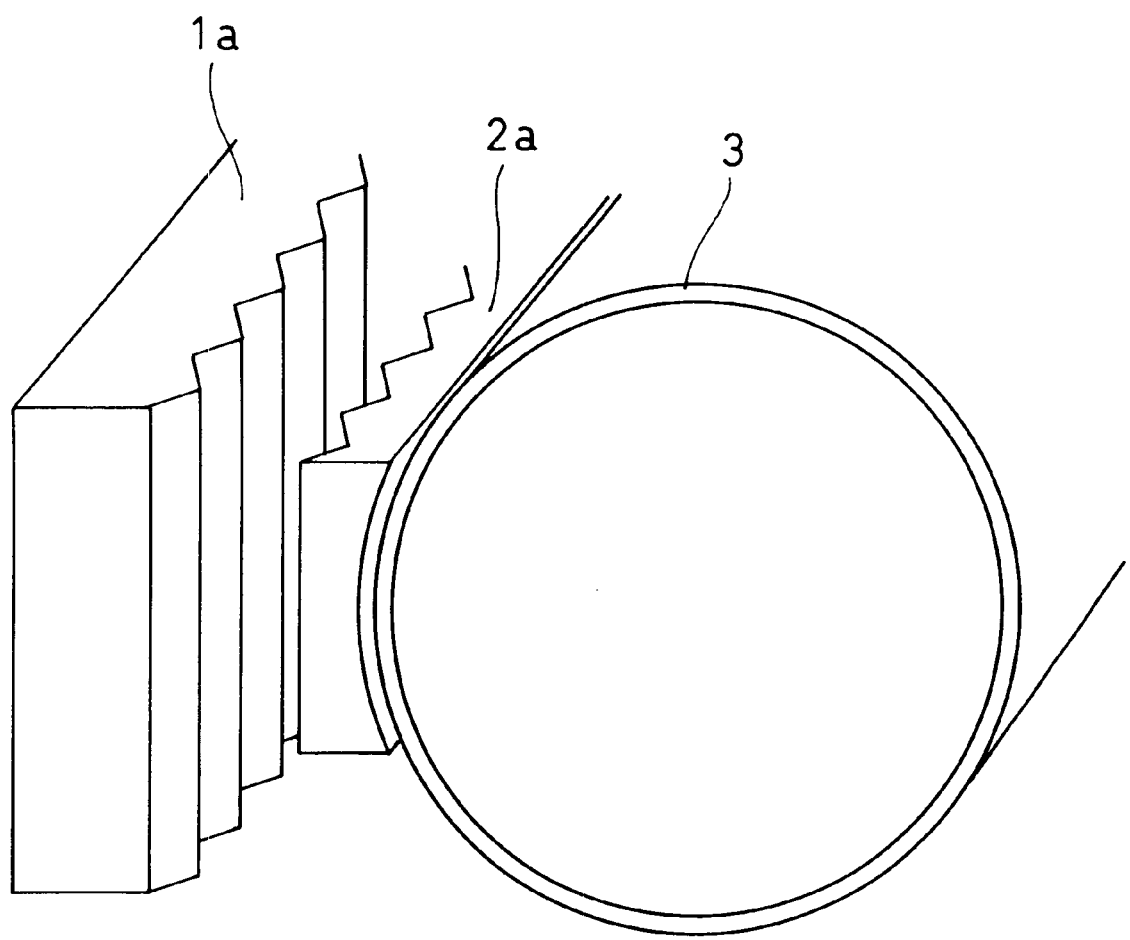
FIG. 2 is a perspective view showing an assembly structure of a part of the projector lens mounting portion of the projector apparatus according to the first embodiment of the present invention.

FIG. 2 is a perspective view showing the assembly structure of a part of the projector lens mounting portion of a projector apparatus according to the first embodiment of the present invention. With reference to these FIGS. 1 and 2, discussion will be given for the projector lens mounting portion of the projector apparatus according to the embodiment of the present invention.

The outer surface of the lens guide portions 2a, 2b is a surface of uneven shapes comprising a plurality of protruded portions, whose vertical section has a protruded portion having an angle of inclination of 45° and an angle of apex of 90° and a recess opposite thereto arranged at a constant pitch in a plurality in a vertical direction with respect to the surface of a liquid crystal panel not shown.

Lens holding portions 1a, 1b are fixed to the projector body which is not shown, and has surfaces of plural uneven shapes, which are brought into tight contact with surfaces of plural uneven shapes of the lens guide portions 2a, 2b.

Light irradiated from the light source not shown is transmitted and shielded by liquid crystal devices (not shown) disposed in a two-dimensional plane shape on the liquid crystal panel disposed on the incident light side of the projector lens mounting portion, whereby the image is created and the light passed through the liquid crystal panel is caused to become incident on the lens group 7.

The light emitted from the outgoing light side through the lens group 7 forms the image on a screen not shown. If the center point of the liquid crystal panel and that of the lens group 7 exist on one axis, the center of the projected image will exist in the extension line thereof.

At this time, the focus adjusting unit 5 is caused to rotate around the center of the lens, whereby a screwed portion between the focus adjusting unit 5 and the lens-barrel portion 6 moves a part of the lens group 7 in the lens axial direction together with the focus adjusting unit 5 to thereby adjust the imaging position of the projected image.

Also, by rotating the zoom adjusting portion 4 around the center of the lens, a cam (not shown) cut on the zoom adjusting unit 4 moves a part of the lens group 7 in an optical axis direction to thereby adjust the size of the projected image.

By rotating the lens fixing unit 3 around the lens axis in anti-clockwise direction, the lens fixing unit 3 moves toward the outgoing light side. At this time, since the outer diameter of the lens fixing unit 3 has a tapered configuration, pressure between the inner surface of the lens guide portions 2a, 2b having such a shape as to constitute a part of a cylinder of a tapered configuration and the lens fixing unit 3 in the right and left directions of the rim of the lens lowers.

For this reason, a static frictional force between the lens guide portions 2a, 2b and the lens holding portions 1a, 1b lowers. This lowered static frictional force enables the lens group 7 to be moved up and down with the uneven surfaces between the lens guide portions 2a, 2b and the lens holding portions 1a, 1b as a guide while the lens fixing unit 3 is being held.

Since the uneven shapes of the lens guide portions 2a, 2b and the lens holding portions 1a, 1b are in contact with each other in a multiplicity of points on the uneven surface, there are less looseness, and it becomes possible to accurately move the lens group 7 in parallel with the planar direction of the liquid crystal panel.

An up-and-down movement of the lens group 7 deviates the central point of the lens in the direction of the up-and-down axis with respect to the central point of the liquid crystal panel to move also the image to be formed on the screen up and down.

In the case where the position of the lens group 7 is fixed, by rotating the lens fixing unit 3 around the lens axis in clockwise direction, the lens fixing unit 3 moves toward the incident light side. At this time, since the outer diameter of the lens fixing unit 3 has the tapered configuration, pressure between the inner surface of the lens guide portions 2a, 2b having such a shape as to constitute a part of the cylinder of the tapered configuration and the lens fixing unit 3 in the right and left directions of the rim of the lens increases.

For this reason, the uneven shapes of the lens guide portions 2a, 2b and the lens fixing portions 1a, 1b increases the static frictional force due to a larger contact area than at the time of planar contact. This increased static frictional force enables the projector lens including the lens group 7 to be fixed in a certain position with respect to the lens holding portions 1a, 1b.

As an adjusting mechanism according to a second embodiment for adjusting pressure to be applied to surfaces of plural uneven shapes formed on the lens guide portions 2a, 2b and the lens holding portions 1a, 1b respectively in the direction of the normal thereto, it is considered that the inner surface of the lens guide portions 2a, 2b is configured by such a shape as to constitute a part of a cylinder.

In this case, the outer diameter of the lens fixing unit 3 is configured into an elliptic shape. By rotating the screwed portion, the outside diameter dimension increases or decreases, the pressure to the lens guide portions 2a, 2b in the right and left directions of the rim of the lens is adjusted.

For this reason, the static frictional force between the lens guide portions 2a, 2b and the lens holding portions 1a, 1b fluctuates. This fluctuation in the static frictional force enables the projector lens position including the lens group 7 to be fixed to or released with respect to the lens holding portions 1a, 1b.

Therefore, sections of the lens guide portions 2a, 2b and the lens holding portions 1a, 1b are made into the surfaces of plural uneven shapes, whereby the contact area to the plane increases, and a high static frictional force proportionate to the contact area can be obtained with respect to a fixed static frictional coefficient.

Furthermore, the surfaces of uneven shapes of the lens guide portions 2a, 2b and the lens holding portions 1a, 1b have also a function as a guide capable of moving only in a certain axial direction without the entire projector lens rotating.

Further, the adoption of the same user interface as another adjusting mechanism such as focus and zoom adjustment of the projector lens enables a manual adjusting and fixing operation for the projector lens position.

Figure 3:
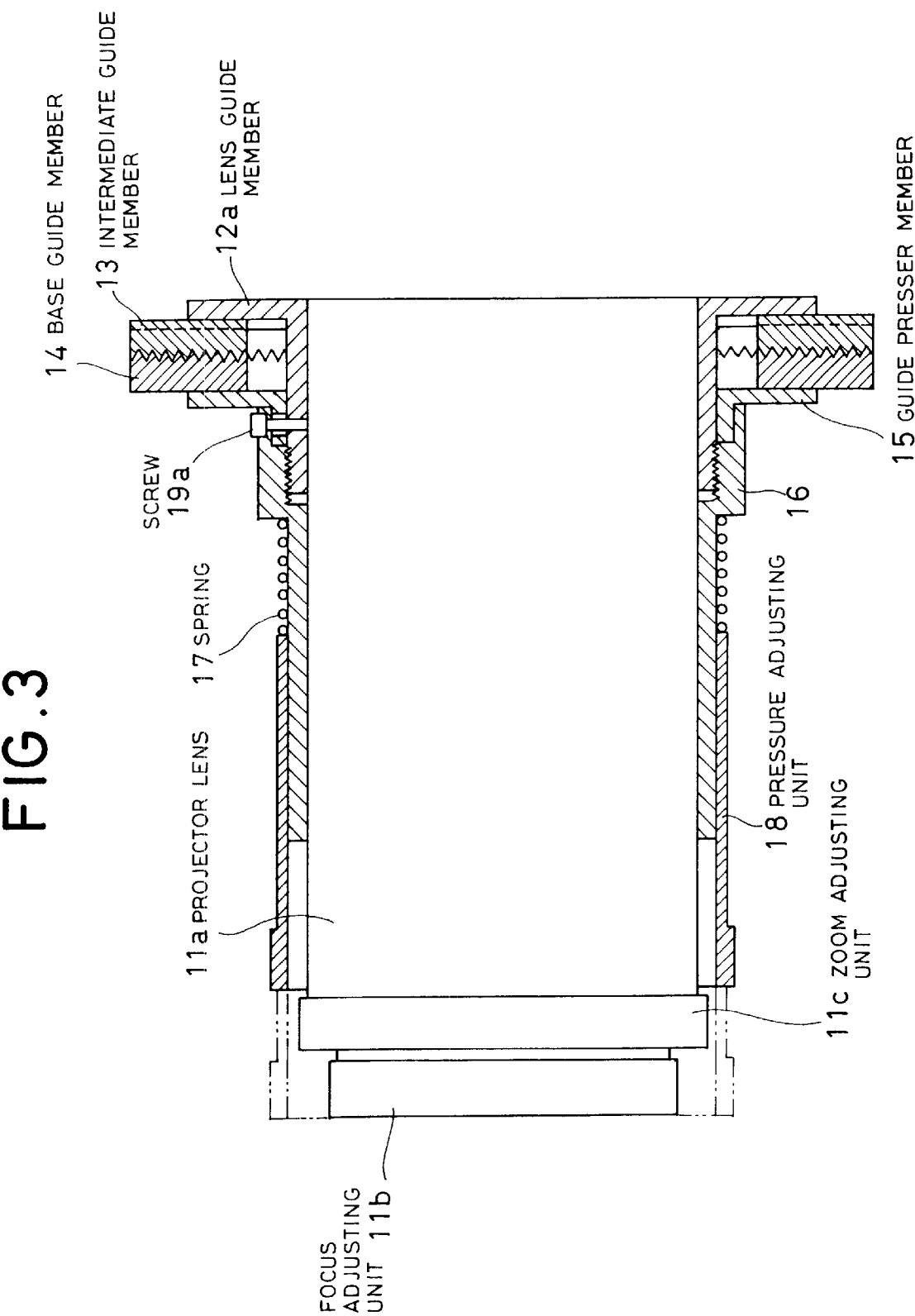
FIG. 3 is a plan view including a partial cross section showing a projector apparatus according to a second embodiment of the present invention as viewed from the side of the projector lens mounting portion.

FIG. 3 is a plan view including a partial cross section showing the projector apparatus according to the second embodiment of the present invention as viewed from the side of the projector lens mounting portion. In FIG. 3, the projector lens 11a is configured by the lens group consisting of a plurality of lenses. The focus adjusting unit 11b and the zoom adjusting unit 11c are rotatably mounted at the lens central axis.

The lens guide member 12a is provided with plural triangular uneven shapes arranged side by side in parallel in the vertical direction on a square plane surface at the projection side. On the outer periphery of the flange portion at the projection side, here is configured a screwed portion. The lens guide member 12a is fixed to the projector lens 11a with a screw 19a.

An intermediate guide member 13 has plural triangular uneven shapes arranged side by side in parallel in the vertical direction on a rectangular plane longer in a vertical direction at the incident light side, and plural triangular uneven shapes arranged side by side in parallel in a horizontal direction on the plane at the projection side. The intermediate guide member 13 is, at the center of the projector lens 11a, formed with a long and round hole which allows the projector lens 11a and the lens guide member 12a to move in the vertical direction.

A base guide member 14 is fixed to the projector body, and has plural triangular uneven shapes provided side by side in parallel in the horizontal direction on a square plane at the incident light side. Also, at the center of the base guide member 14, there is formed a round hole having a diameter equal to a length of the long, round hole of the intermediate guide member 13 in the vertical direction, in which the projector lens 11a and the lens guide member 12a are movable in the horizontal direction with the projector lens 11a as the center.

A guide presser member 15 is configured to mount a flange portion onto a square plane. In the flange portion of the guide presser member 15, there is formed an elongated opening in the projection direction, and a screw 19a fixes the lens guide member 12a to the projector lens 11a through this elongated opening.

Figure 4:
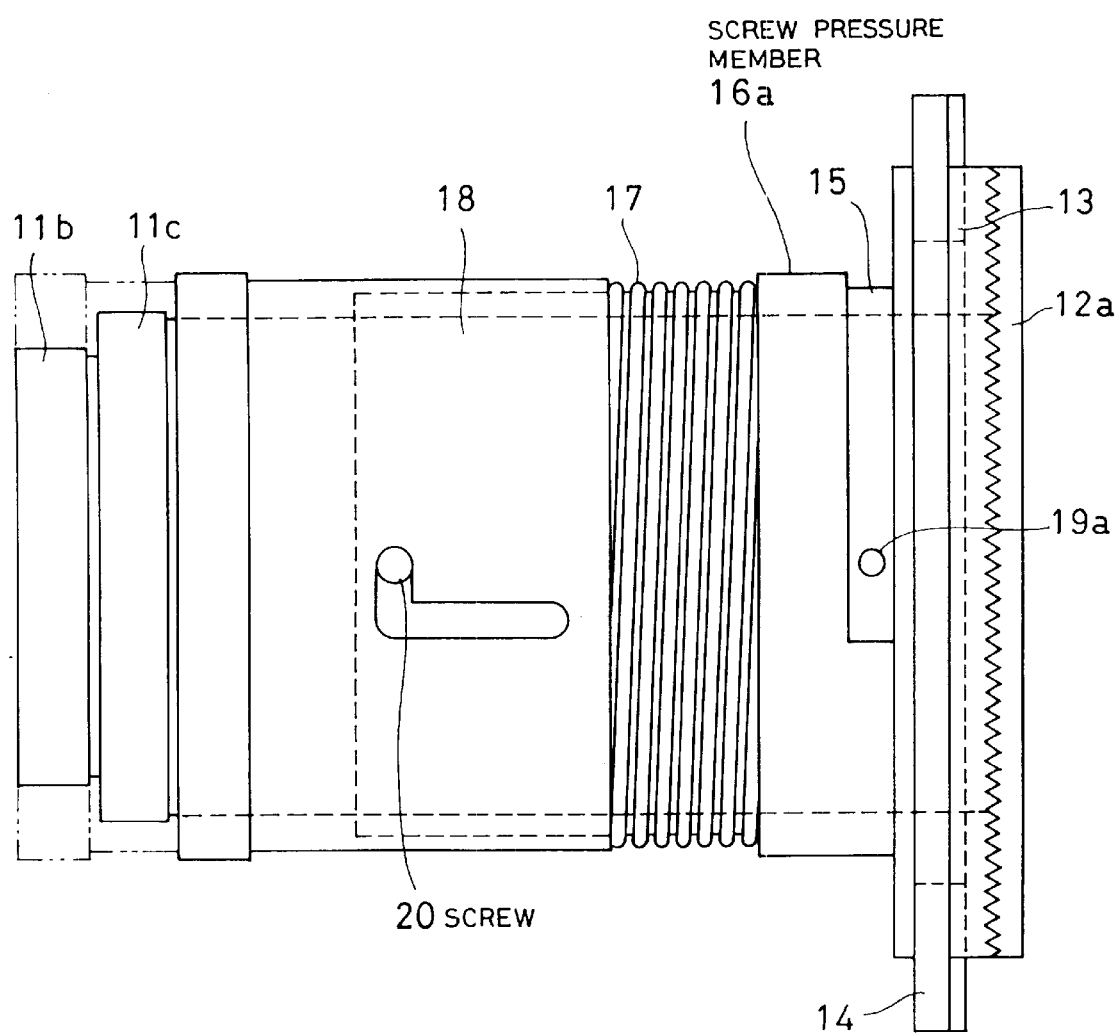
FIG. 4 is a plan view showing the projector apparatus according to the second embodiment of the present invention as viewed from the top surface of the projector lens mounting portion.

FIG. 4 is a plan view showing the projector apparatus according to the second embodiment of the present invention as viewed from the top surface of the projector lens mounting portion, In FIG. 4, a screw pressure member 16a has a flange portion, the inner side of which is screwed, and is mounted to a screwed portion on the outer periphery of the flange portion of the lens guide member 12a at the projection side.

The flange portion of the screw pressure member 16a on the incident light side has a cut-off portion at the projection side, and a spring 17 and a pressure adjusting unit 18 are mounted on the outer periphery portion of the screw pressure member 16a. The pressure adjusting unit 18 is formed with a key-shaped hole. A screw 20 is fixed to the screw pressure member 16a through the key-shaped hole in the pressure adjusting unit 18.

Figure 5:
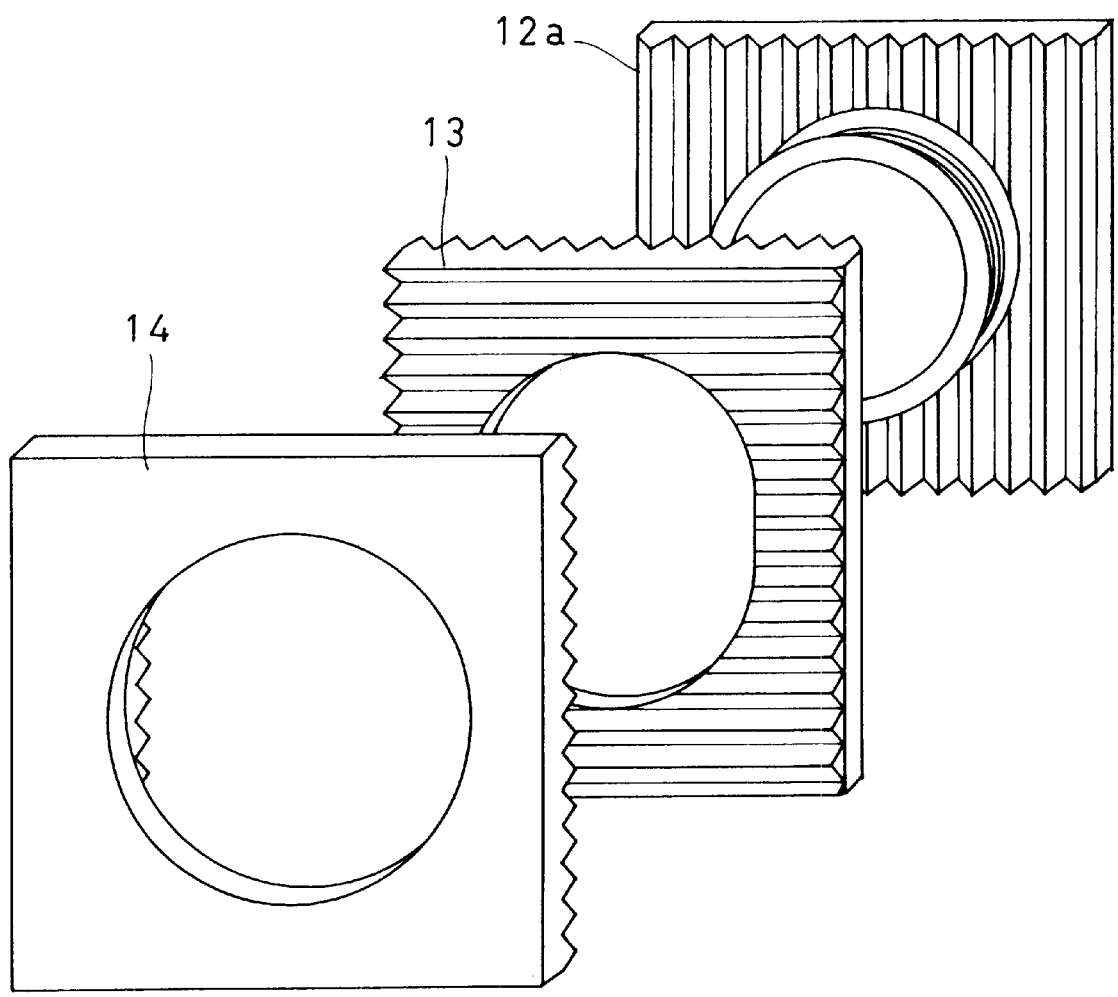
FIG. 5 is a perspective view showing partial assembly structure of the projector lens mounting portion of the projector apparatus according to the second embodiment of the present invention.

FIG. 5 is a perspective view showing partial assembly structure for the projector lens mounting portion in the projector apparatus according to the second embodiment of the present invention. In FIG. 5, the surface of uneven shapes of the lens guide member 12a in the vertical direction has a shape, which is brought, at the central position, into tight contact with the surface having uneven shapes of the intermediate guide member 13 on the incident light side so as to enable the projector lens 11a to accurately move in the vertical direction.

The projection side of the intermediate guide member 13 has the surface of uneven shapes in the horizontal direction, orthogonal to the surface of uneven shapes on the incident light side, and has a shape, which is brought, at the central position, into tight contact with the surface having uneven shapes of the base guide member 14 at the incident light side so as to enable the lens guide member 12a and the intermediate guide member 13 to accurately move in the horizontal direction.

Further, pressure is applied to the surface of uneven shapes of each guide member in the direction of the normal thereto by the pressure adjusting mechanism, whereby it is possible to obtain a greater static frictional force by an amount corresponding to the increase in area to be brought into tight contact with the plane, making it possible to fix the position of the projector lens 11a.

Figure 6:
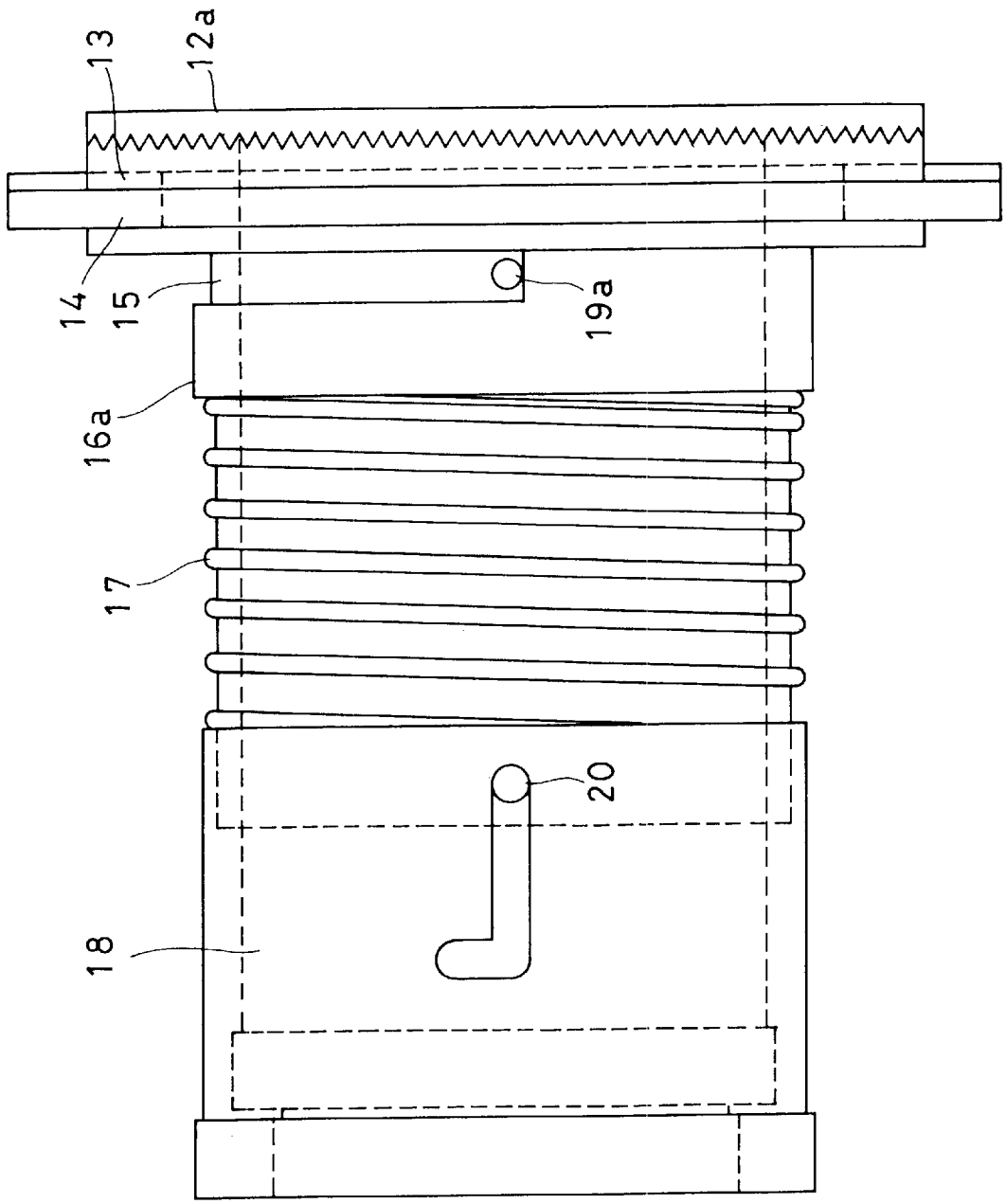
FIG. 6 is a plan view showing the projector lens mounting portion of the projector apparatus according to the second embodiment of the present invention as viewed from the top surface of a lens movement operating state.

FIG. 6 is a plan view showing the projector lens mounting portion of the projector apparatus according to the second embodiment of the present invention as viewed from the top surface of a lens movement operating state. In FIG. 6, the pressure adjusting unit 18 is rotated around the projector lens 11a in anti-clockwise direction as viewed from the projection side, whereby the position of the screw 20 is rotated with the key-shaped hole as the guide.

When the screw 20 reaches a longer portion of the key-shaped hole of the pressure adjusting portion 18 in the projection direction, the spring 17 pushes the pressure adjusting portion 18 out on the projection side. Thereby, the pressure adjusting unit 18 moves to the tip end portion of the projector lens 11a to improve the operativity in pressure adjustment and movement of the projector lens 11a.

The pressure adjusting unit 18 rotates in anti-clockwise direction, thereby the screw pressure member 16a rotates through the screw 20. This rotation rotates the screw pressure member 16a and the screw portion of the lens guide member 12a in a direction to loosen their screws, and the pressure onto the guide presser member 15 on the incident light side is weakened.

Further, pressure on respective surfaces of uneven shapes of the base guide member 14, the intermediate guide member 13 and the lens guide member 12a in the direction of the normal thereto lowers to lower the static frictional force, whereby the projector lens 11a can be accurately moved on the plane.

A cut-off portion of the screw pressure member 16a on the projection side is constructed such that it cannot rotate by a certain amount or more, not to reduce the pressure by means of a screw 19a. This structure is capable of preventing each member from being deviated due to excessive rotation of the pressure adjusting portion 18, respective uneven shapes of the base guide member 14, the intermediate guide member 13 and the lens guide member 12a from causing gaps due to looseness, the projected image from being defocused, or a single blur in which a part of the image is blurred.

After the position of the projector lens 11a is adjusted, by lotating the pressure adjusting unit 18 around the projector lens 11a in clockwise direction as viewed from the projection side, the screw pressure member 16a rotates through the screw 20. This rotation rotates the screw pressure member 16a and the screw portion of the lens guide member 12a in a direction to tighten their screws, and the pressure onto the guide presser member 15 on the incident light side is increased.

Also, pressure on respective surfaces of uneven shapes of the base guide member 14, the intermediate guide member 13 and the lens guide member 12a in the direction of the normal thereto increases to increase the static frictional force, whereby the position of the projector lens 11a can be fixed. Pressing the pressure adjusting unit 18 in the direction of incidence causes the screw 20 to press the spring 17 with the key-shaped hole as the guide. Further, the pressure adjusting unit 18 is caused to rotate in clockwise direction to thereby enable the pressure adjusting unit 18 to be housed and fixed.

Figure 7:
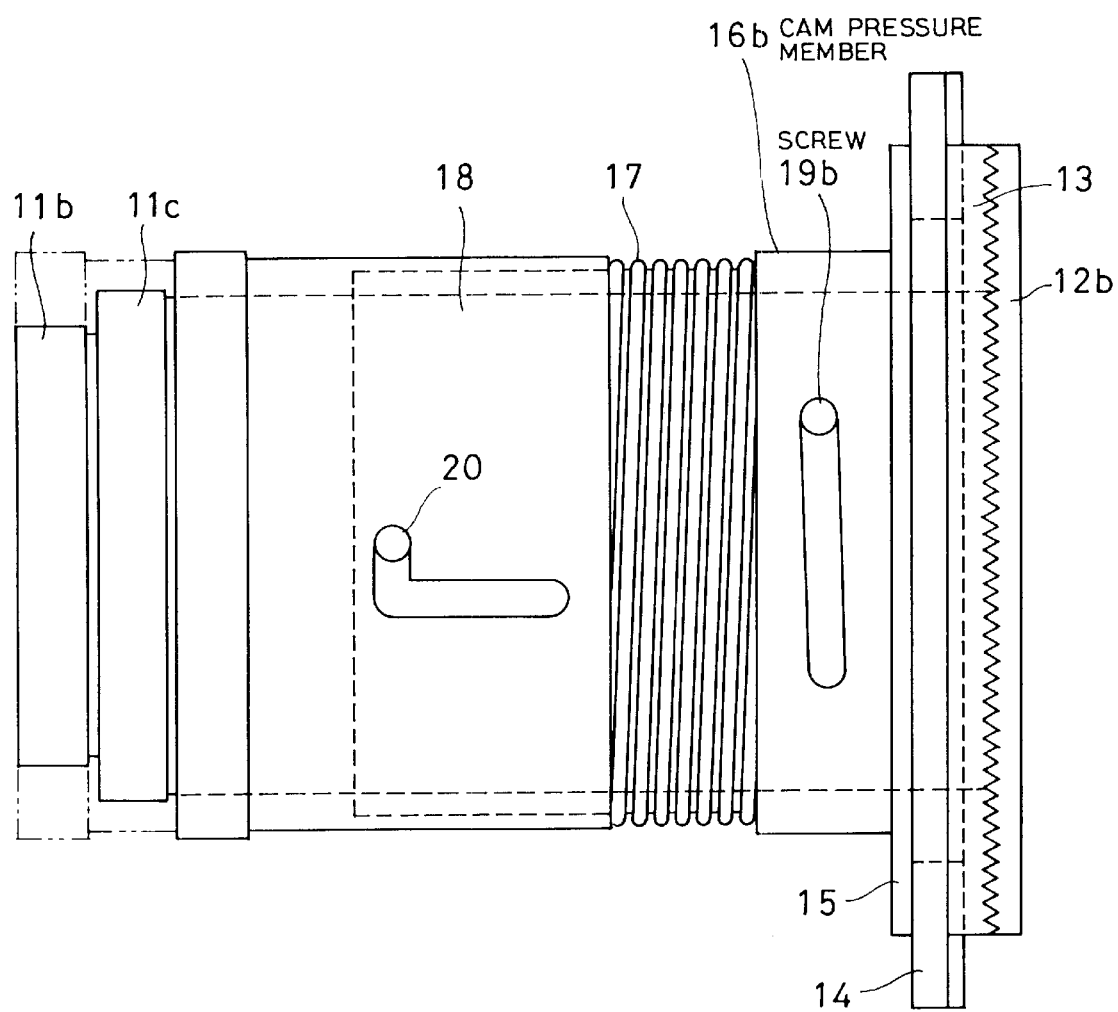
FIG. 7 is a plan view showing the projector lens mounting portion of the projector apparatus according to the second embodiment of the present invention as viewed from the top surface of another pressure adjusting mechanism.

FIG. 7 is a plan view showing the projector lens mounting portion of the projector apparatus according to the second embodiment of the present invention as viewed from the top surface of another pressure adjusting mechanism. In FIG. 7, the flange portion of the lens guide member 12b is not formed with any screw, but the projector lens 11a is fixed by a screw 19b.

A cam pressure member 16b has a flange portion formed with a cam. By rotating the pressure adjusting unit 18 around the projector lens 11a, the cam pressure member 16b rotates, and the pressure onto the guide presser member 15 on the incident light side is adjusted with a screw 19b as a guide. There is no possibility that the pressure on respective surfaces of uneven shapes of the base guide member 14, the intermediate guide member 13 and the lens guide member 12b in the direction of the normal thereto exceeds a fixed pressure, and lowers enough to cause any looseness depending upon the shape of the cam in the cam pressure member 16b.

FIG. 8A is a side view showing a positional returning mechanism, which is a part of the projector lens mounting portion in the projector apparatus according to the second embodiment of the present invention; FIG. 8B is a front view showing the positional returning mechanism, which is a part of the projector lens mounting portion in the projector apparatus according to the second embodiment of the present invention; and FIGS. 8C and 8D are front views showing a projector lens adjusting state for the positional returning mechanism, which is a part of the projector lens mounting portion in the projector apparatus according to the second embodiment of the present invention. In these FIGS. 8A to 8D, the positional returning mechanism according to another embodiment of the present invention performs an operation of always returning the projector lens to a fixed position when the pressure on the guide surface of uneven shapes in the direction of the normal lowers by the pressure adjusting mechanism.

More specifically, the base guide member 14 and the intermediate guide member 13 having a guide surface of uneven shapes for moving the projector lens 11a in the horizontal direction have pins 33, 34 mounted thereto at the center position in the horizontal direction. Hooks 31a, 31b mounted to the pins 33, 34 are mounted to the base guide member 14 by spring mounting portions 32a, 32b through springs 30a, 30b.

When the projector lens 11a, the lens guide member 12a and the intermediate guide member 13 are moved in the left direction as viewed from the direction of projection respectively with respect to the base guide member 14, the pin 34 moves in the left direction together with the intermediate guide member 13. In this case, as shown in FIG. 8C, the position of the hook 31b is not changed, but the hook 31a moves in the left direction with the movement of the pin 34.

At this time, the spring 30a is extended to generate a force whereby it is going to return to the center position. When the pressure lowers from a state fixed by the pressure adjusting mechanism at this position, the force, whereby the spring 30a is going to return, overcomes the static frictional force on the guide surfaces of the base guide member 14 and the intermediate guide member 13 to return the projector lens 11a, the lens guide member 12a and the intermediate guide member 13 to the center position respectively.

FIG. 8D shows a state in which the projector lens 11a, the lens guide member 12a and the intermediate guide member 13 have been moved in the right direction as viewed from the direction of projection with respect to the base guide member 14. In this case, the position of the hook 31a is not changed, but the hook 31b moves to the right direction with the movement of the pin 34 in contrast with the state shown in FIG. 8C.

At this time, the spring 30b is extended to generate a force whereby it is going to return to the center position. When the pressure lowers from the state fixed by the pressure adjusting mechanism at this position, the force, whereby the spring 30b is going to return, overcomes the static frictional force on the guide surfaces of the base guide member 14 and the intermediate guide member 13 to return the projector lens 11a, the lens guide member 12a and the intermediate guide member 13 to the center position respectively.

Also, even in the vertical direction, the same structural part as the positional returnign mechanism shown in FIG. 8 is mounted to the intermediate guide member 13 in place of the base guide member 14, and is mounted to the lens guide member 12a in place of the intermediate guide member 13, whereby when the pressure on the guide surfaces lowers due to the pressure adjusting mechanism, it becomes possible to always return to a fixed position.

Figures 9A, 9B:
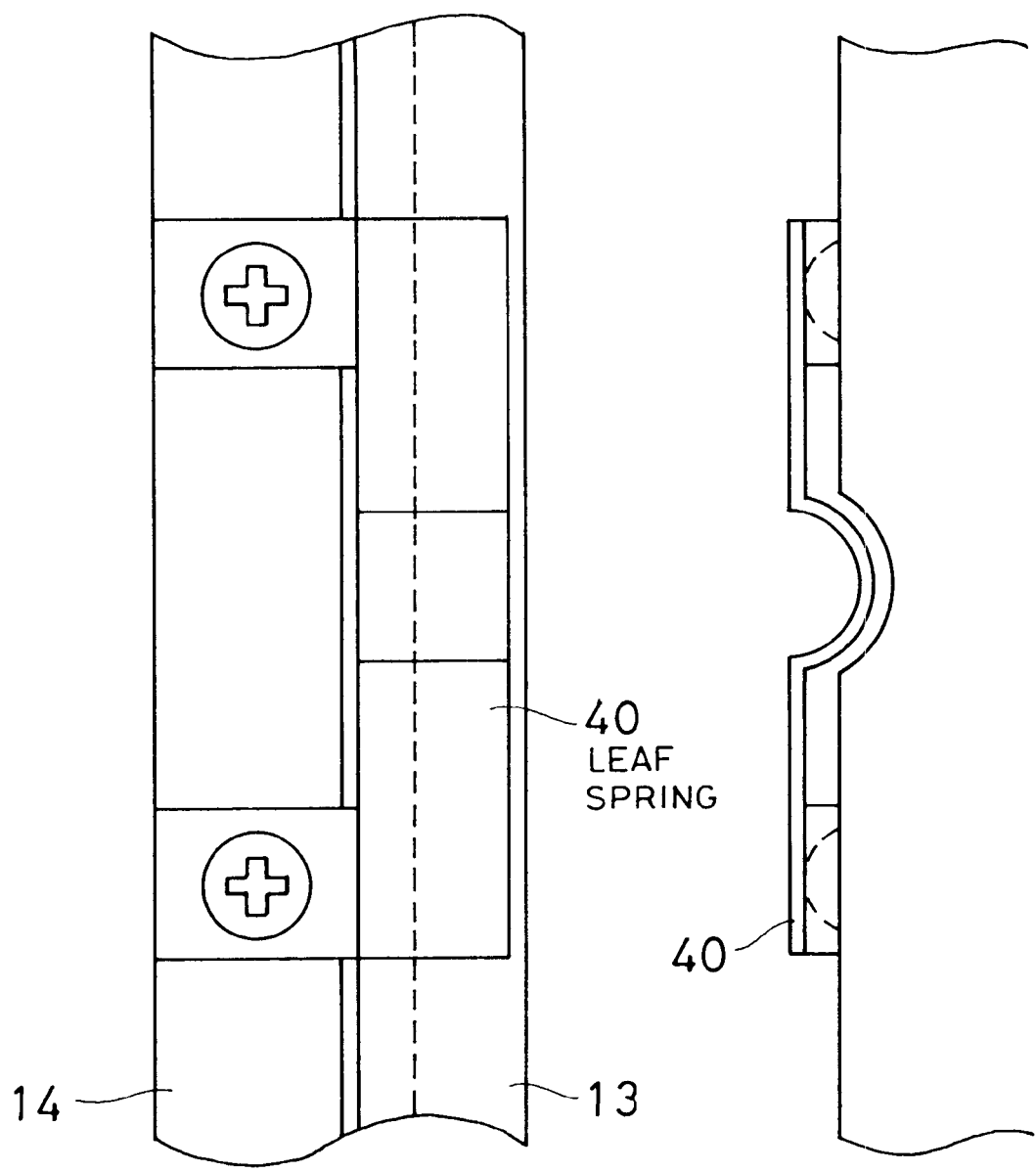
FIG. 9A is a front view showing a center stopper mechanism which is a part of the projector lens mounting portion of the projector apparatus according to the second embodiment of the present invention.
FIG. 9B is a side view showing the center stopper mechanism which is a part of the projector lens mounting portion of the projector apparatus according to the second embodiment of the present invention.

FIG. 9A is a front view showing a center stopper mechanism which is a part of the projector lens mounting portion in the projector apparatus according to the second embodiment of the present invention; and FIG. 9B is a side view showing the center stopper mechanism which is a part of the projector lens mounting portion in the projector apparatus according to the second embodiment of the present invention. The center stopper mechanism shown in FIGS. 9A and 9B is capable of recognizing the center position in the moving state of the projector lens 11a.

In these FIGS. 9A and 9B, a leaf spring 40 mounted onto the base guide member 14 has a depressed tip end portion. The intermediate guide member 13 has also a similar depression shape at the center position in the horizontal direction.

When the position of the projector lens 11a is moved rightward or leftward, the leaf spring 40 slides on the top surface of the intermediate guide member 13. When the projector lens 11a reaches the center position in the horizontal direction, the leaf spring 40 falls into the depression shape of the intermediate guide member 13 to generate a feeling of click. Thereby, the operator is capable of recognizing the center position in the horizontal direction.

Also, even in the vertical direction, the same structural part as the center stopper mechanism shown in FIG. 9 is mounted to the intermediate guide member 13 in place of the base guide member 14, and is mounted to the lens guide member 12a in place of the intermediate guide member 13, whereby the center position in the vertical direction can be recognized.

Figure 10:
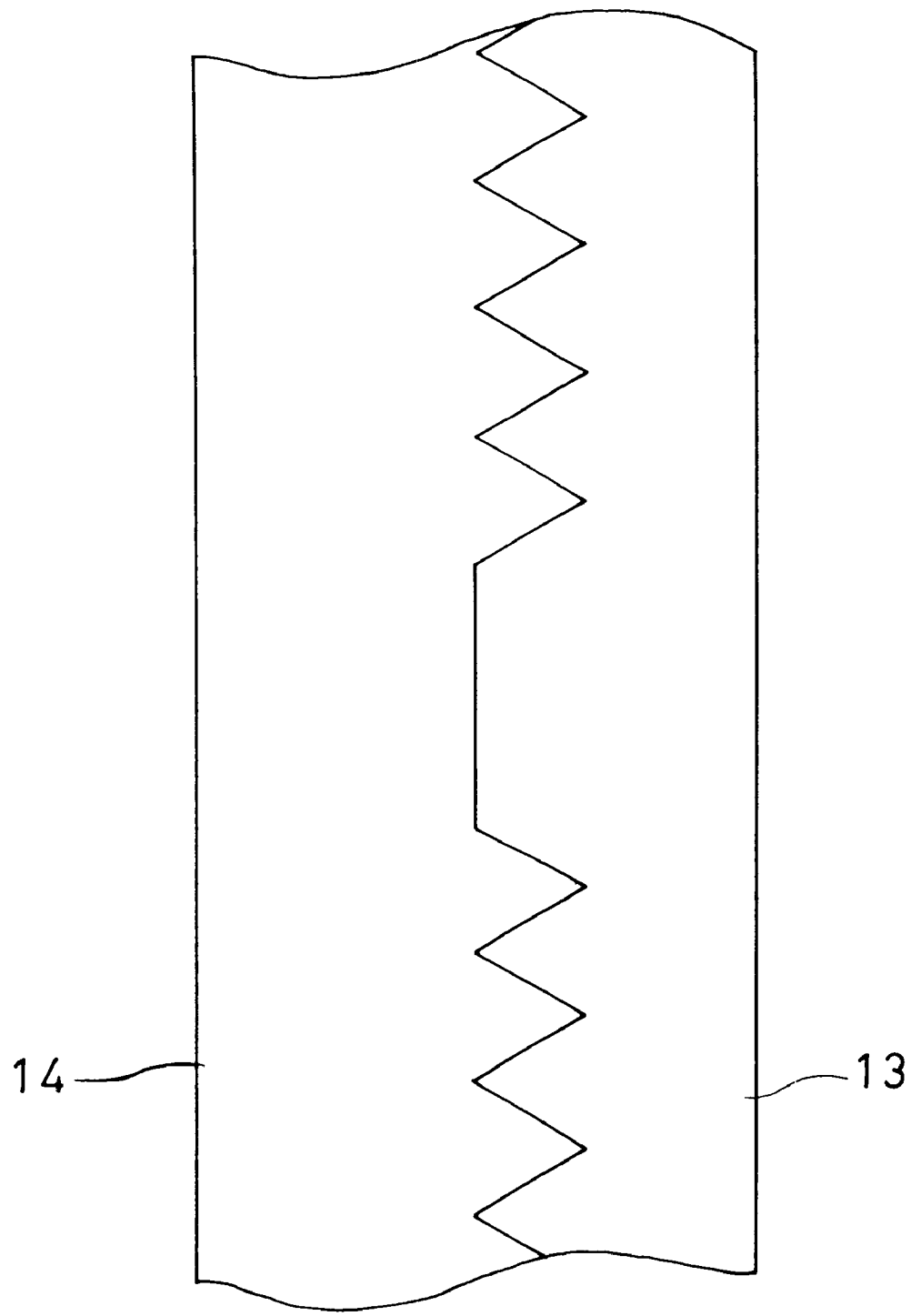
FIG. 10 is a plan view showing a shape of a guide surface which is a part of the projector lens mounting portion of the projector apparatus according to a third embodiment of the present invention.

FIG. 10 is a plan view showing a shape of the guide member according to the third embodiment of the present invention. In FIG. 10, the base guide member 14 has a shape free from any mountain portion at the center position of triangular uneven surfaces arranged at a constant pitch thereon. Also, the intermediate guide member 13 has a shape free from any valley portion at the center position of triangular uneven surfaces arranged at a constant pitch thereon.

Thereby, as compared with case where all portions have triangular uneven surfaces, it becomes possible to easily assemble the base guide member 14 and the intermediate guide member 13 without mistaking the center position at all times.

Thus, in the projector apparatus for enlarging and projecting the image on a display device (not shown) on the screen through a projector lens 11a by means of light to be projected from the light source not shown, comprising:

an intermediate guide member 13, holding:
a lens guide member 12a fixed to the projector lens 11a, having the surface of plural uneven shapes stretched in one axial direction; and
the projector lens 11a, and consisting of:
an X guide member having the surface of plural uneven shapes, which are brought into tight contact with the surface having plural uneven shapes of the lens guide member 12a; and
a Y guide member having the surface of plural uneven shapes stretched in an axial direction intersecting at right angles the X guide member; and
a base guide member 14 having the surface, which are brought into tight contact with the surface having uneven shapes of the Y guide member, and being fixed to the projector apparatus, whereby it is possible to provide a highly precise mechanism in a simple structure as a positional adjusting mechanism for the projector lens 11a on the display device surface. Also, it is possible to manually move and fix the projector lens 11a by means of the user interface unified into the focus and zoom adjusting mechanism.

As described above, according to the projector apparatus of the present invention, in the projector apparatus for enlarging and projecting the image on the display device on the screen through the projector lens by means of light to be projected from the light source, there are provided:

the lens guide member fixed to the projector lens, whose sectional shape is plural uneven shapes stretched in one axis; the lens holding member holding the projector lens and having the section of plural uneven shapes, which are brought into tight contact with the surface having plural uneven shapes of the lens guide member; and the pressure adjusting mechanism for adjusting pressure to be applied to the surface having plural uneven shapes of the lens guide member and the surface having plural uneven shapes of the lens holding member in a direction of the normal thereto. Thus, there is the effect that it is possible to provide a highly-precise mechanism in a simple structure as the positional adjusting mechanism of the projector lens on the display device surface, and to manually move and fix the projector lens by means of the user interface unified into the focus and zoom adjusting mechanism.

Also, according to another projector apparatus of the present invention, in the projector apparatus for enlarging and projecting the image on the display device on the screen through the projector lens by means of light to be projected from the light source, there are provided:

the lens guide member fixed to the projector lens, having the surface of plural uneven shapes stretched in one axial direction;

the X guide member having the surface, which are brought into tight contact with the surface of plural uneven shapes of the lens guide member;

the Y guide member having the surface of plural uneven shapes stretched in an axial direction intersecting at right angles the X guide member; and the base guide member having the surface, which are brought into tight contact with the surface of uneven shapes of the Y guide member, and being fixed to its own apparatus, whereby there is the effect that it is possible to accurately move the projector lens on a two-dimensional plane in a simple structure, and to manually move the projector lens by means of the user interface unified into the focus and zoom adjusting mechanism of the projector lens.

What is claimed is:

1. A projector apparatus for enlarging and projecting an image on a display device on a screen through a projector lens by means of light to be projected from a light source, comprising:

a lens guide member fixed to said projector lens, whose sectional shape is plural uneven shapes stretched in one axis;

a lens holding member holding said projector lens and having a section of plural uneven shapes, which are brought into tight contact with the surface having plural uneven shapes of said lens guide member; and a pressure adjusting mechanism for adjusting pressure to be applied to the surface having plural uneven shapes of said lens guide member and the surface having plural uneven shapes of said lens holding member in a direction of the normal thereto.

2. The projector apparatus according to claim 1, wherein said sectional shape is made into said plural uneven shapes, whereby said lens guide member is configured so as to enable said projector lens to move in parallel with the surface of said display device.

3. The projector apparatus according to claim 1, wherein an operating unit of said pressure adjusting mechanism mounted to the outer periphery of said projector lens is rotated around the central axis of said projector lens, whereby said pressure adjusting mechanism is configured so as to adjust pressure to be applied to the surface of plural uneven shapes of said lens guide member and the surface of plural uneven shapes of said lens holding member in the direction of the normal thereto.

4. The projector apparatus according to claim 1, further comprising:

a lens group consisting of a plurality of lenses constituting said projector lens;

a focus adjusting member, to which a part of said lens group is mounted, for focus-adjusting said projector lens;

a zoom adjusting member, to which a part of said lens group is mounted, for zoom-adjusting said projector lens;

a lens-barrel member, to which a part of said lens group is mounted, and to which said focus adjusting member and said zoom adjusting member are rotatively mounted at the central axis of the lens; and a lens fixing member to be mounted to said lens-barrel member by means of a screw cut on the inner periphery, wherein the outer periphery of said lens fixing member is formed in a tapered configuration such that the outside diameter thereof becomes the larger from the incident light side toward the outgoing light side, and the inner surface of said lens guide member is formed into such a shape as to constitute a part of a cylinder of a tapered configuration such that the inner diameter thereof becomes the larger from the incident light side toward the outgoing light side.

5. The projector apparatus according to claim 4, wherein said projector apparatus is configured such that said lens fixing member is caused to rotate around said central axis in anti-clockwise direction, whereby pressure between the inner surface of said lens guide member having such a shape as to constitute a part of a cylinder of a tapered configuration and said lens fixing member in the right and left directions of the rim of the lens is caused to lower by means of a shape of the outer periphery of said lens fixing member and said lens group is enabled to move in one axial direction.

6. The projector apparatus according to claim 4, wherein said projector apparatus is configured such that said lens fixing member is caused to rotate around said central axis in clockwise direction, whereby pressure between the inner surface of said lens guide member having such a shape as to constitute a part of a cylinder of a tapered configuration and said lens fixing member in the right and left directions of the rim of the lens is caused to increase by means of a shape of the outer periphery of said lens fixing member and the position of said lens group is fixed.

7. The projector apparatus according to claim 1, further comprising:

a lens group consisting of a plurality of lenses constituting said projector lens;

a focus adjusting member, to which a part of said lens group is mounted, for focus-adjusting said projector lens;

a zoom adjusting member, to which a part of said lens group is mounted, for zoom-adjusting said projector lens;

a lens-barrel member, to which a part of said lens group is mounted, and to which said focus adjusting member and said zoom adjusting member are rotatively mounted at the central axis of the lens; and a lens fixing member to be mounted to said lens-barrel member by means of a screw cut on the inner periphery, wherein said lens guide member has an inner surface configured into such a shape as to constitute a part of a cylinder, and said lens fixing member is configured such that the outside diameter thereof becomes elliptical.

8. A projector apparatus for enlarging and projecting an image on a display device on a screen through a projector lens by means of light to be projected from a light source, comprising:

a lens guide member fixed to said projector lens, having a surface of plural uneven shapes stretched in one axial direction;

an X guide member having a surface, which is brought into tight contact with the surface having plural uneven shapes of said lens guide member;

a Y guide member having a surface of plural uneven shapes stretched in an axial direction intersecting at right angles said X guide member; and a base guide member having a surface, which is brought into tight contact with the surface having uneven shapes of said Y guide member, and being fixed to its own apparatus.

9. The projector apparatus according to claim 8, wherein the surface of plural uneven shapes stretched in one axial direction of said X guide member and the surface of plural uneven shapes stretched in one axial direction of said Y guide member are configured by the front and back surfaces of one member.

10. The projector apparatus according to claim 8, wherein said X guide member and said Y guide member are configured in such a manner as to freely move said projector lens on a plane parallel with the surface of said display device by forming the surfaces of plural uneven shapes in two-axial directions orthogonal to each other.

11. The projector apparatus according to claim 8, wherein said lens guide member, said X guide member, said Y guide member and said base guide member include a pressure adjusting mechanism for applying pressure to the respective surfaces having plural uneven shapes in a direction of the normal thereto.

12. The projector apparatus according to claim 11, wherein an operating unit of said pressure adjusting mechanism mounted to the outer periphery portion of a lens-barrel of said projector lens is rotated around the center of said projector lens, whereby said pressure adjusting mechanism is configured so as to freely adjust pressure to be applied to their respective surfaces of plural uneven shapes in said lens guide member, said X guide member, said Y guide member and said base guide member in the direction of the normal thereto.

13. The projector apparatus according to claim 12, wherein said pressure adjusting mechanism operating unit is mounted so as to be freely moved in the direction of projection of said projector lens, and to be freely housed when pressure is not adjusted.

14. The projector apparatus according to claim 11, wherein said projector apparatus includes a returning mechanism for always returning said projector lens to a certain one point when the pressure of said pressure adjusting mechanism is adjusted to make said projector lens freely movable.

15. The projector apparatus according to claim 8, wherein said lens guide member, said X guide member, said Y guide member and said base guide member are configured so as to eliminate partial recesses or protruded portions of their respective surfaces of plural uneven shapes, and to freely assemble by aligning to the center position of said projector lens.

16. The projector apparatus according to claim 8, wherein said projector apparatus includes an X center stopper mechanism and a Y center stopper mechanism for giving a feeling of click at the center positions on axes, on which said lens guide member and said X guide member, and said Y guide member and said base guide member are movable.

* * * * *